United States Patent
Lienhard

(10) Patent No.: US 10,302,159 B2
(45) Date of Patent: May 28, 2019

(54) METHOD FOR DETERMINING A BITE POINT OF A HYBRID CLUTCH IN A HYBRID VEHICLE

(71) Applicant: Schaeffler Technologies AG & Co. KG, Herzogenaurach (DE)

(72) Inventor: Markus Lienhard, Karlsruhe (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 47 days.

(21) Appl. No.: 15/537,635

(22) PCT Filed: Dec. 10, 2015

(86) PCT No.: PCT/DE2015/200534
§ 371 (c)(1),
(2) Date: Jun. 19, 2017

(87) PCT Pub. No.: WO2016/110284
PCT Pub. Date: Jul. 14, 2016

(65) Prior Publication Data
US 2017/0343064 A1    Nov. 30, 2017

(30) Foreign Application Priority Data
Jan. 8, 2015 (DE) .................. 10 2015 200 108

(51) Int. Cl.
*F16H 48/08* (2006.01)
*F16D 48/08* (2006.01)
(Continued)

(52) U.S. Cl.
CPC ........... *F16D 48/08* (2013.01); *B60W 10/023* (2013.01); *B60W 20/20* (2013.01); *F16D 48/06* (2013.01);
(Continued)

(58) Field of Classification Search
CPC ....................................................... F16D 48/08
See application file for complete search history.

(56) References Cited

U.S. PATENT DOCUMENTS 8,392,083 B2   3/2013   Hodrus et al.
9,233,684 B2   1/2016   Park
(Continued)

FOREIGN PATENT DOCUMENTS

DE   102008030473   1/2009
DE   102008001140   10/2009
(Continued)

*Primary Examiner* — Derek D Knight
(74) *Attorney, Agent, or Firm* — Volpe and Koenig, P.C.

(57) ABSTRACT

The invention relates to a method for determining a bite point of a hybrid clutch in a hybrid vehicle. The hybrid clutch is actuated by a hydrostatic clutch actuator (12) and disconnects or connects an internal combustion engine (2) and an electric motor (3); the bite point is determined by slowly actuating the hybrid clutch (4) starting from a separating position of the hybrid clutch (4), this position being in the non-actuated state, with a defined torque reaction of the electric motor (3) being detected. The invention also relates to a method in which the quality of the bite point is improved, the duration of the bite point adaptation is essentially shortened, the bite point being adapted during the running of the internal combustion engine (2) and when the electric motor (3) is immobile and a torque reaction of the electric motor (3) is validated by the torque reaction of the internal combustion engine (2).

10 Claims, 1 Drawing Sheet

(51) Int. Cl.
*F16D 48/06* (2006.01)
*B60W 10/02* (2006.01)
*B60W 20/20* (2016.01)

(52) U.S. Cl.
CPC .......... *F16D 2500/1026* (2013.01); *F16D 2500/1066* (2013.01); *F16D 2500/10412* (2013.01); *F16D 2500/30421* (2013.01); *F16D 2500/5012* (2013.01); *F16D 2500/50236* (2013.01); *F16D 2500/50251* (2013.01); *F16D 2500/50275* (2013.01); *F16D 2500/50281* (2013.01); *F16D 2500/70605* (2013.01)

(56) References Cited

U.S. PATENT DOCUMENTS

2004/0157704 A1  8/2004  Stork et al.
2013/0066530 A1  3/2013  Holzer et al.

FOREIGN PATENT DOCUMENTS

| | | |
|---|---|---|
| DE | 102010024941 | 1/2011 |
| DE | 102012224278 | 3/2014 |
| DE | 102013104747 | 11/2014 |
| WO | 03006841 | 1/2003 |
| WO | 2011134451 | 11/2011 |

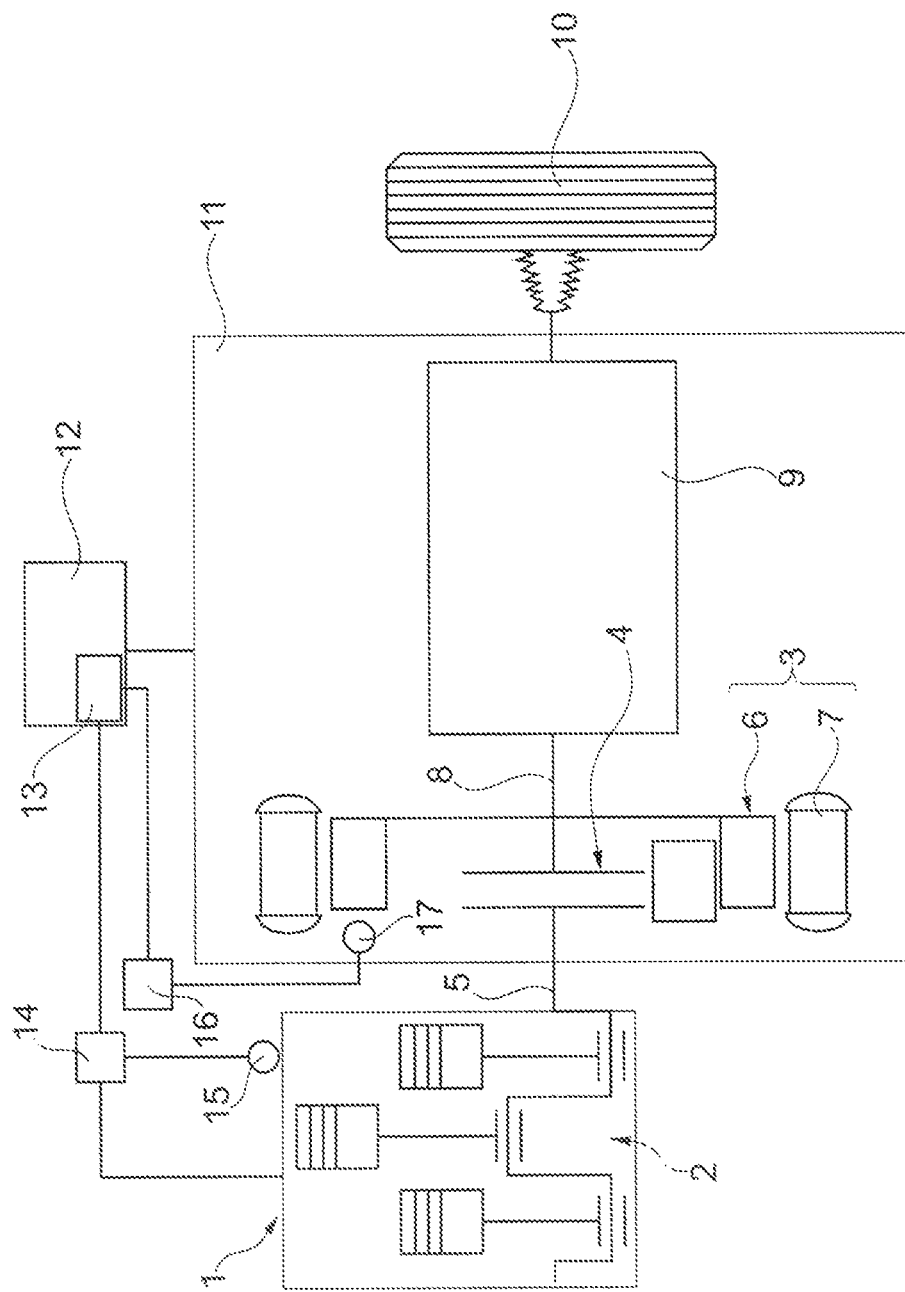

METHOD FOR DETERMINING A BITE POINT OF A HYBRID CLUTCH IN A HYBRID VEHICLE

BACKGROUND

The invention relates to a method for determining a bite point of a hybrid clutch of a hybrid vehicle, which is actuated by a hydrostatic clutch actuator, with the hybrid clutch disconnecting or connecting an internal combustion engine and an electric motor, and the bite point being detected by a slow actuation of the hybrid clutch, starting from a separating position of the hybrid clutch which it assumes in an idle state, upon a defined torque reaction of the electric motor.

DE 10 2010 024 941 A1 discloses a method for controlling a duplex clutch—transmission with at least two partial drive trains, allowing each of them to be coupled via a clutch to an internal combustion engine. During drive operation of the vehicle comprising the duplex clutch—transmission, a bite point of the clutch is determined independent from the motor torque. This bite point is here determined during the start of operation of the vehicle and then adapted during operation of the vehicle.

In a hybrid vehicle with a hybrid drive train the driving resistance can be overcome by mechanical energy from two independent energy sources, such as fuel of an internal combustion engine and electric energy from a traction battery of an electric motor. According to DE 10 2008 030 473 A1 a method is known for determining the bite point of an automatic hybrid clutch in a hybrid drive train. The bite point of the hybrid clutch, which is arranged between an internal combustion engine and an electric traction drive, is determined when the internal combustion engine is stationary by slowly closing the hybrid clutch and evaluating the influence of the closing hybrid clutch upon the electric machine of the electric traction drive, which rotates with a predetermined speed.

The quality of the bite point detection largely depends on the quality of the regulator of the electric motor used, because attention is given only and exclusively to the reaction of the speed controller of the electric motor used. This means that all weaknesses of the controller, such as reaction time, superimposing vibrations, oscillation behavior, must be corrected by adjusting the adaption routine. For this reason waiting times are provided until the controller of the electric motor has reached its stationary condition. Furthermore, speed controllers frequently incite oscillations of different frequencies. In order to eliminate them, the torque signal must be filtered, which additionally slows down the determination of the bite point, because tuning the filter also requires some time.

SUMMARY

The invention is therefore based on the objective to provide a method for determining a bite point of a hybrid clutch, in which the waiting times provided to adjust electronics are reduced and in spite thereof the quality of the bite point determined is improved.

According to the invention the objective is attained such that the bite point is adapted with a running internal combustion engine and an immobile electric motor, and the torque reaction of the electric motor is validated with a torque reaction of the internal combustion engine. This is advantageous in that waiting times can be shortened because a torque reaction of the internal combustion engine can be determined more quickly and it is no longer required to wait until the electric motor has reached its stationary condition. Furthermore, the quality of the bite point measurement is considerably improved with regards to precision, speed of determination, and reproducibility.

Advantageously the electric motor is speed controlled in the stationary condition. Due to the fact that it is not necessary to start the electric motor, here a time saving effect is possible during the determination of the bite point because the adaption process can start immediately. The time required can be considerably shortened because it is not required to accelerate the stationary electric motor to a certain speed for the speed control, thus the adaption of the bite point no longer needs to be suspended.

In one embodiment, the internal combustion engine is controlled for an idling speed. Due to the vibrations generated when the internal combustion engine is in operation any friction in the system is prevented so that the bite point can be better determined.

In one embodiment, the internal combustion engine is disconnected from the drive train during the adaption of the bite point. Thus, the vehicle is stationary, here, which ensures that vibrations of the drive train cannot lead to any distortion of the bite point measurement.

In one variant, a start-up routine is used for the purpose of adapting the bite point during operation of the hybrid vehicle by which a first bite point is determined during the start-up of the hybrid vehicle, with the hybrid clutch being approached to the proximity of a previously determined bite point and, based on this previously determined bite point, the hybrid clutch is further displaced until the defined torque reaction is detected. This is advantageous in that during the adaption of the bite point during the drive operation of the hybrid vehicle the adaption process can be considerably shortened, because a previously determined bite point is used for the adaption of the bite point. The presently given bite point can therefore be determined considerably faster.

In one variant, during the start-up of the hybrid vehicle, the first bite point of the hybrid clutch is determined within the start-up routine, which during a first adaption is used as the previously determined bite point for determining the presently given bite point during the operation of the hybrid vehicle. By this first bite point determined during the start-up routine of the hybrid vehicle the range, in which the displacement of the bite point is assumed, is already known so that the hybrid clutch can be moved into this area in the adaption phase and thus the time for determining the presently given bite point can be shortened.

In one variant, the most recently determined bite point is used as the previously determined bite point, which was determined in the adaption phase directly preceding the present adaption phase. In this method, too, by using the bite point determined in the directly preceding adaption phase a very rapid approach to a potentially given bite point is ensured, reducing the time for determining the presently given bite point.

In another variant, a torque increase is monitored as a torque reaction, with here conclusions being drawn for the defined increase in torque when a predetermined threshold of the torque increase is exceeded. By utilizing the threshold a particularly precise determination of the bite point torque can be realized, so that the adapted, presently given bite point can be precisely determined.

BRIEF DESCRIPTION OF THE DRAWINGS

The invention allows numerous embodiments. One of them shall be explained in greater detail based on the FIGURE shown in the drawing.

Shown is

FIG. 1: an illustration of the principle of a hybrid drive of a hybrid vehicle.

DETAILED DESCRIPTION OF THE PREFERRED EMBODIMENTS

FIG. 1 shows an illustration of the principle of a drive train 1 of a hybrid vehicle. The drive train 1 comprises an internal combustion engine 2 and an electric motor 3. A hybrid clutch 4 is arranged between the internal combustion engine 2 and the electric motor 3, directly downstream the internal combustion engine 2. The internal combustion engine 2 and the hybrid clutch 4 are connected to each over via a crankshaft 5. The electric motor 3 comprises a rotational rotor 6 and a stationary stator 7. The driven shaft 8 of the hybrid clutch 4 is connected to a transmission, which comprises a coupling element, not shown in greater detail, for example a second clutch or a torque converter, arranged between the electric motor 3 and the transmission 9. The transmission 9 transfers the torque generated by the internal combustion engine 2 and/or the electric motor 3 to the driving wheels 10 of the hybrid vehicle. The hybrid clutch 4 and the transmission form here a transmission system 11, which is controlled by a hydrostatic clutch actuator 12 used in combination with the hybrid clutch 4, which is closed in the idle state. The hybrid clutch 4 is actuated over a hydrostatic path by the hydrostatic clutch actuator 12.

The hydrostatic clutch actuator 12 comprises a control device 13, which is connected to an idling speed control 14 of the internal combustion engine 1, with a first speed sensor 15 leading thereto, detecting the speed of the internal combustion engine 1. Furthermore, the control device 13 is connected to a speed controller 16 of the electric motor 3, which is also supplied with respective rotational speeds of the electric motor 3 by a second speed sensor 17, opposite the rotor 6 of the electric motor 3.

The bite point is particularly important for controlling the hybrid clutch 4 and is therefore determined during the initial start-up routine of the vehicle. The adaption of the bite point occurs with the internal combustion engine 2 being in motion, operating at idling speeds, during the operation of the vehicle. Here, the vehicle is stationary. In order to determine the bite point the hybrid clutch 4 is slowly closed and the electric motor 3 is controlled via the speed controller 16 to 0 revolutions. By the slow closing of the hybrid clutch 4 it respectively develops slowly a torque and transfers this torque from the internal combustion engine to the electric motor 3. The idling speed controller 14 of the internal combustion engine 2 at the side of the internal combustion engine and the speed controller 16 at the side of the electric motor 3 become active and respectively increase their torque in order to maintain the speed set. Here, the change in torque of the internal combustion engine 1 is used for validation of the change in torque set by the electric motor 2.

At the point of time at which the hybrid clutch 4 begins to transfer torque, the electric motor 3 is slightly entrained. Due to the speed control applied to the electric motor 3 the torque of the electric motor 3 increases. When a defined increase in torque is given the present bite point is detected. Due to the fact that the electric motor 3 is stationary at the start of the determination process of the bite point any speed undershoots are reliably prevented.

During the first start-up of the hybrid vehicle a start-up routine is initiated to determine the first bite point. The torque of the electric motor 3 is increased by closing the hybrid clutch 4. The hybrid clutch is closed to a minimum bite point position, which has been determined by way of calculation. Starting from this minimum bite point position, the hybrid clutch 4 is slowly closed, with the hybrid clutch 4 showing constant speed. During the closing process of the hybrid clutch 4 the torque is further monitored both at the electric motor 3 as well as at the internal combustion engine 2. At the very moment at which the torque of the internal combustion engine 2 exceeds a predetermined threshold and the torque of the electric motor 3 shows a similar value a conclusion is drawn regarding the bite point, with a waiting time being shortened in which the electric motor 3 can assume its stationary condition. Subsequently the hybrid clutch 4 is opened again and it is checked if the torque level of the electric motor 3 at the end of the start-up process is equivalent to the torque level the electric motor 3 issued at the onset of the start-up routine.

This start-up routine, in which the bite point is determined for the first time, is followed by adaption phases during the drive operation of the hybrid vehicle, in which the bite point determined in this fashion is adapted in order to allow considering changes of the bite point caused by wear and tear, temperature, and the like, thus allowing a more precise controlling of the clutch actuator 12.

At the bite point adaption during operation of the hybrid vehicle, here the start-up routine is used, which was used during the initial start-up operation of the hybrid vehicle. Due to the fact that by the start-up operation a first bite point is already known, this bite point is used to move the hybrid clutch 4 almost up to said bite point position known. By the rapid approach of the hybrid clutch 4 to the known bite point position here the times for bite point adaption is shortened. After the approach to this known bite point position the hybrid clutch 4 is slowly closed again and the torque issued by the electric motor 3 and/or the internal combustion engine 2 is monitored and evaluated in the manner described.

The method explained significantly improves the quality of the bite point adaption by additionally evaluating the torque of the internal combustion engine. Here, the torque of the internal combustion engine 1 represents a redundant information source by which the precision of the bite point determination can be considerably increased and the duration can be shortened by eliminating waiting times.

LIST OF REFERENCE CHARACTERS

1 Drive train
2 Internal combustion engine
3 Electric motor
4 Hybrid clutch
5 Crankshaft
6 Rotor
7 Stator
8 Driven shaft
9 Transmission
10 Driving wheels
11 Transmission system
12 Hydrostatic clutch actuator
13 Control device
14 Idling speed controller
15 Speed sensor
16 Speed controller
17 Speed sensor

The invention claimed is:
1. A method for determining a bite point of a hybrid clutch of a hybrid vehicle, which is actuated by a hydrostatic clutch actuator, with the hybrid clutch disconnecting or connecting an internal combustion engine and an electric motor, the method comprising:

determining the bite point, while the internal combustion engine is operating and the electric motor is stationary, by slowly activating the hybrid clutch, starting from a separating position of the hybrid clutch until a defined torque reaction of the electric motor is detected, and validating a torque reaction of the electric motor with a torque reaction of the internal combustion engine.

2. The method according to claim 1, further comprising speed controlling the electric motor to be stationary.

3. The method according to claim 1, further comprising speed controlling the internal combustion engine to an idling speed.

4. The method according to claim 1, further comprising disconnecting the internal combustion engine from a drive train while adapting the bite point.

5. The method according to claim 1, further comprising: using a start-up routine by which a first bite point is determined during a start-up of the hybrid vehicle by displacing the hybrid clutch, starting from a previously determined bite point, and further displacing the hybrid clutch until the defined torque reaction is detected.

6. The method according to claim 5, further comprising determining the first bite point of the hybrid clutch via the start-up routine, and using said bite point during a first adaption in order to determine a present bite point during operation of a hybrid vehicle based on the previously determined bite point.

7. The method according to claim 5, wherein a most recently determined bite point is used as the previously determined bite point, which is determined directly preceding a present adaption phase.

8. The method according to claim 1, further comprising monitoring a torque increase as the torque reaction, and adapting the bite point when a predetermined threshold of the torque increase is exceeded.

9. A method for adapting a bite point of a hybrid clutch of a hybrid vehicle including the hybrid clutch disconnecting or connecting an internal combustion engine and an electric motor, the method comprising:

adapting the bite point, while the internal combustion engine is running and the electric motor is stationary, based on a validation of a torque reaction of the electric motor with a torque reaction of the internal combustion engine.

10. The method according to claim 9, wherein the validation is carried out by closing the hybrid clutch until torque is transferred between the internal combustion engine and the electric motor.

* * * * *